US009928656B2

(12) United States Patent
Jiang et al.

(10) Patent No.: US 9,928,656 B2
(45) Date of Patent: Mar. 27, 2018

(54) MARKERLESS MULTI-USER, MULTI-OBJECT AUGMENTED REALITY ON MOBILE DEVICES

(71) Applicant: Futurewei Technologies, Inc., Plano, TX (US)

(72) Inventors: Wei Jiang, Princeton, NJ (US); Jinwei Gu, Princeton, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 45 days.

(21) Appl. No.: 14/852,247

(22) Filed: Sep. 11, 2015

(65) Prior Publication Data
US 2017/0076499 A1    Mar. 16, 2017

(51) Int. Cl.
G09G 5/12 (2006.01)
G06T 19/00 (2011.01)
G11B 27/00 (2006.01)
G06T 7/00 (2017.01)

(52) U.S. Cl.
CPC .............. *G06T 19/006* (2013.01); *G06T 7/00* (2013.01); *G11B 27/00* (2013.01); *G06T 2219/024* (2013.01)

(58) Field of Classification Search
CPC .................................................. G06T 19/006
USPC ....................................................... 345/633
See application file for complete search history.

(56) References Cited

U.S. PATENT DOCUMENTS

| 8,907,941 | B2 * | 12/2014 | Gay ................. G06T 11/00 345/419 |
| 9,015,584 | B2 * | 4/2015 | Park .................. G06F 3/0488 715/702 |
| 9,089,769 | B2 * | 7/2015 | Yamaoka ............ A63F 13/10 |
| 9,442,624 | B2 * | 9/2016 | Yang ................... G06F 21/31 |
| 2007/0220342 | A1 * | 9/2007 | Vieira .............. G06F 11/3688 714/33 |
| 2009/0109240 | A1 * | 4/2009 | Englert ............. G06T 19/006 345/633 |
| 2010/0304720 | A1 * | 12/2010 | Lucero .............. H04N 1/00127 455/414.1 |

(Continued)

FOREIGN PATENT DOCUMENTS

CN    101510913 A    8/2009
CN    102695032 A    9/2012

(Continued)

OTHER PUBLICATIONS

"Shaping WaterSheds" augmented reality Sandbox Facilitator'S guide, S. Geoffrey Schladow et al., University of California-Davis, 2011.*

(Continued)

*Primary Examiner* — Javid A Amini
(74) *Attorney, Agent, or Firm* — Conley Rose, P.C.

(57) ABSTRACT

Methods and devices permit a user to insert multiple virtual objects into a real world video scene. Some inserted objects may be statically tied to the scene, while other objects are designated as moving with certain moving objects in the scene. Markers are not used to insert the virtual objects. Users of separate mobile devices can share their inserted virtual objects to create a multi-user, multi-object augmented reality (AR) experience.

14 Claims, 9 Drawing Sheets

(56) References Cited

U.S. PATENT DOCUMENTS

| | | | |
|---|---|---|---|
| 2011/0037712 A1* | 2/2011 | Kim | H04M 1/7253 345/173 |
| 2012/0206558 A1* | 8/2012 | Setton | H04N 7/147 348/14.03 |
| 2012/0210254 A1 | 8/2012 | Fukuchi et al. | |
| 2013/0021535 A1* | 1/2013 | Kim | H04N 21/4122 348/738 |
| 2013/0303285 A1* | 11/2013 | Kochi | G06T 19/006 463/32 |
| 2014/0055492 A1* | 2/2014 | Cohen | A63F 13/10 345/633 |
| 2014/0063061 A1* | 3/2014 | Reitan | G09G 3/003 345/633 |
| 2014/0092010 A1* | 4/2014 | Sako | H04N 13/044 345/156 |
| 2015/0363481 A1* | 12/2015 | Haynes | G06Q 10/10 707/748 |
| 2016/0337612 A1* | 11/2016 | Im | G06T 19/006 |

FOREIGN PATENT DOCUMENTS

| | | |
|---|---|---|
| CN | 103777757 A | 5/2014 |
| CN | 104740869 A | 7/2015 |

OTHER PUBLICATIONS

Henrysson, A., et al., "Face to Face Collaborative AR on Mobile Phones," Proceedings, Fourth IEEE and ACM International Symposium on Mixed and Augmented Reality, Oct. 5-8, 2005, 11 pages.

Hartley, Richard, et al., "Multiple View Geometry in Computer Vision," Second Edition, Cambridge University Press, 2003, pp. 1-673.

Lepetit, V., et al., "EPnP: An Accurate O (n) Solution to the PnP Problem," IJCV, Apr. 15, 2008, 12 pages.

Nutzi, G., et al., "Fusion of IMU and Vision for Absolute Scale Estimation," Journal of Intelligence and Robotic Systems, 2011, 8 pages.

Zhang, Zhengyou, "A Flexible New Technique for Camera Calibration," Technical Report MSR-TR-98-71, IEEE Transactions on Pattern Analysis and Machine Intelligence, 22(11):1330-1334, 2000, Dec. 2, 1998, 22 pages.

Partial English Translation and Abstract of Chinese Patent Application No. CN104740869, Jul. 1, 2015, 7 pages.

Partial English Translation and Abstract of Chinese Patent Application No. CN101510913, Aug. 19, 2009, 9 pages.

Partial English Translation and Abstract of Chinese Patent Application No. CN103777757, May 7, 2014, 8 pages.

Foreign Communication From a Counterpart Application, PCT Application No. PCT/CN2016/098465, International Search Report dated Nov. 29, 2016, 4 pages.

Ma., et al., "Collaborative Geometry-Aware Augmented Reality with Depth Sensors,"UbiComp, '14, Adjunct, Sep. 13-17, 2014, Seattle, WA, pp. 251-254.

Wilkinson, et al., "Linear Algebra," Handbook Series Linear Algebra, "Singular Value Decomposition and Least Squares Solutions, Contributed by Golub and Reinsch", Numer. Math. 14, Springer Verlag, pp. 403-420, 1971.

* cited by examiner

MARKERLESS MULTI-USER, MULTI-OBJECT AUGMENTED REALITY ON MOBILE DEVICES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Augmented reality (AR) is a technology that superimposes a computer-generated image on a user's view of the real world, thus providing a composite view. The increasing popularity of modern powerful mobile devices combined with the expanding transmission bandwidths have enabled a wide variety of mobile AR applications, which provides modern users a variety of enriched experiences. Some stand-alone mobile applications may have been developed to help users semi-automatically insert virtual two-dimensional (2D) images or videos into the captured 2D photos or videos. The insertion points for the images typically are predefined markers.

SUMMARY

Methods and devices are described herein that permit inserting multiple virtual objects into a real world video scene. Some inserted objects may be statically tied to the scene, while other objects are designated as moving with certain moving objects in the scene. Markers are not used to insert the virtual objects. Users of separate mobile devices can share their inserted virtual objects to create a multi-user, multi-object AR experience.

In some embodiments, a mobile device includes a processor and a display coupled to the processor. The processor is configured to receive a virtual object from another mobile device. The received virtual object was inserted into a second real world video scene on the other mobile device. The processor is further configured to render a first real world video scene on the display with inserted multiple virtual objects and the received virtual object from the other mobile device to create a shared augmented reality experience.

In another embodiment, a mobile device includes a processor, and a display coupled to the processor. The processor is configured to separate a video frame, based an input, into a static portion that contains video content that does not move within a real world video scene and a dynamic portion that contains video content that does move within the real world video scene. The processor also is configured to insert a first virtual object into the static portion, insert a second virtual object into the dynamic portion, and render the world video scene on the display with the inserted first virtual object statically tied to the static portion and the second virtual object moving within the real world video scene with a moving real world object in the dynamic portion.

In a method embodiment, a method includes receiving input as to where to insert a first virtual object into a first real world video scene and receiving a second virtual object from another mobile device. Such received virtual object was inserted into a second real world video scene on the other mobile device. The method further includes rendering the first real world video scene on a display with the first and second virtual objects to create a shared augmented reality experience.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

This disclosure refers to "objects" inserted into a "real world" scene. The real world scene is a still image or video of a physical surrounding that is acquired by a mobile camera. The objects to be inserted may be computer-generated or may be digital images of actual physical objects.

As noted above, some AR systems require the use of markers to which to map the visual objects to be inserted into a real world scene. Such markers are generally used when the virtual objects are provided beforehand, so that the AR system can easily recognize a marker and insert the corresponding, predetermined object. However, the embodiments disclosed herein avoid the need to include markers in the real word scene. The embodiments disclose various applications and methods for recognition of real-world images without markers. Further, the disclosed embodiments permit each user to insert multiple objects into a real word scene and some inserted object may be statically tied to the scene, while other inserted objects move with the moving objects in the real word scene. Further still, two or more users can collaborate to share their inserted objects to thereby result in a shared AR experience. For example, one user can insert objects A and B and another user inserts objects C and D. The shared AR experience includes all four objects A, B, C, and D.

Figure 1:
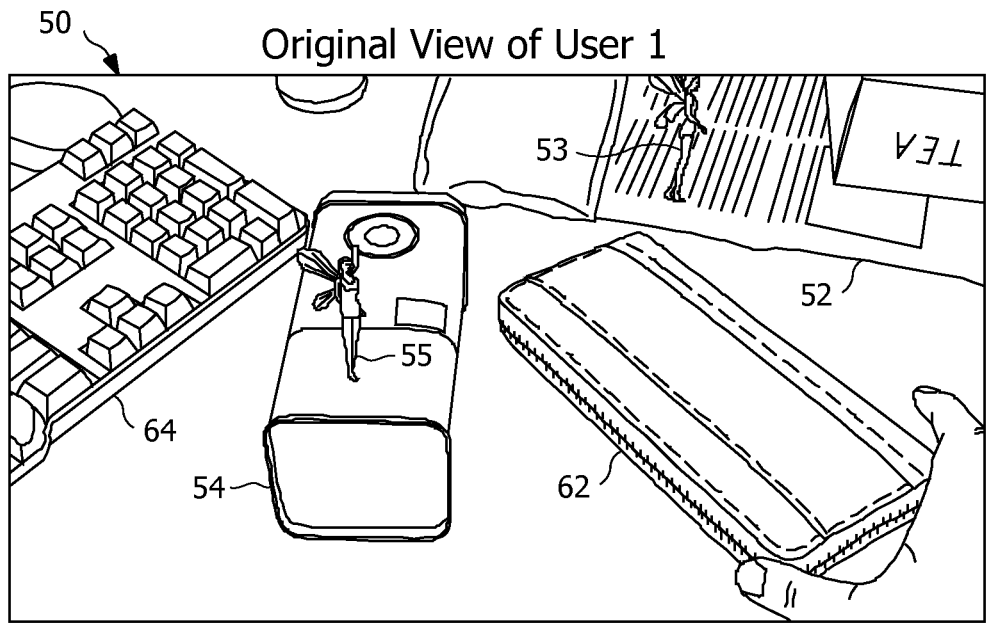
FIGS. 1-4 show examples of multiple users inserting objects into a real world scene as viewed by each user's mobile camera and then sharing the objects with the other user in accordance with various embodiments.
Figure 2:
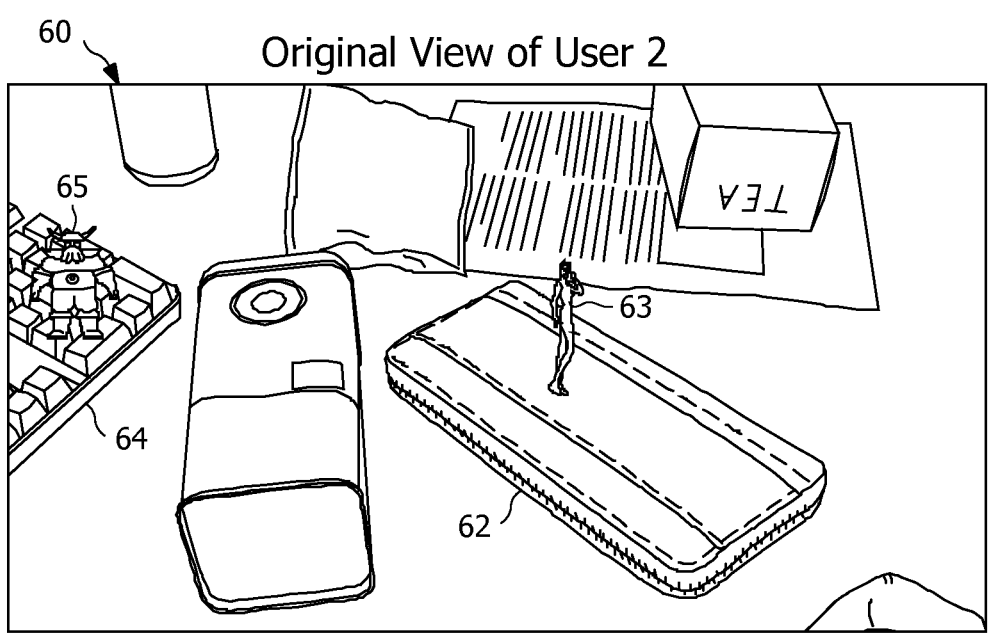
Figure 3:
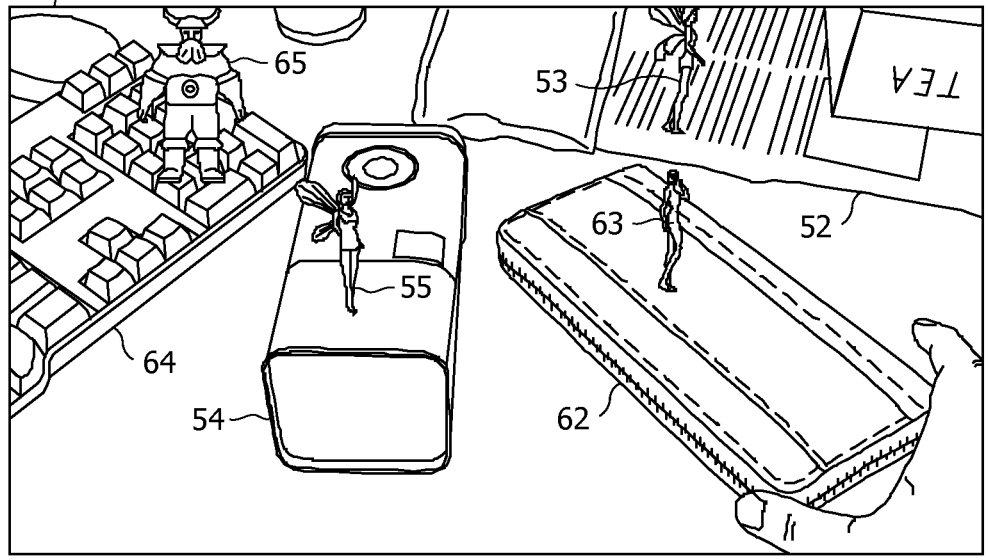
Figure 4:
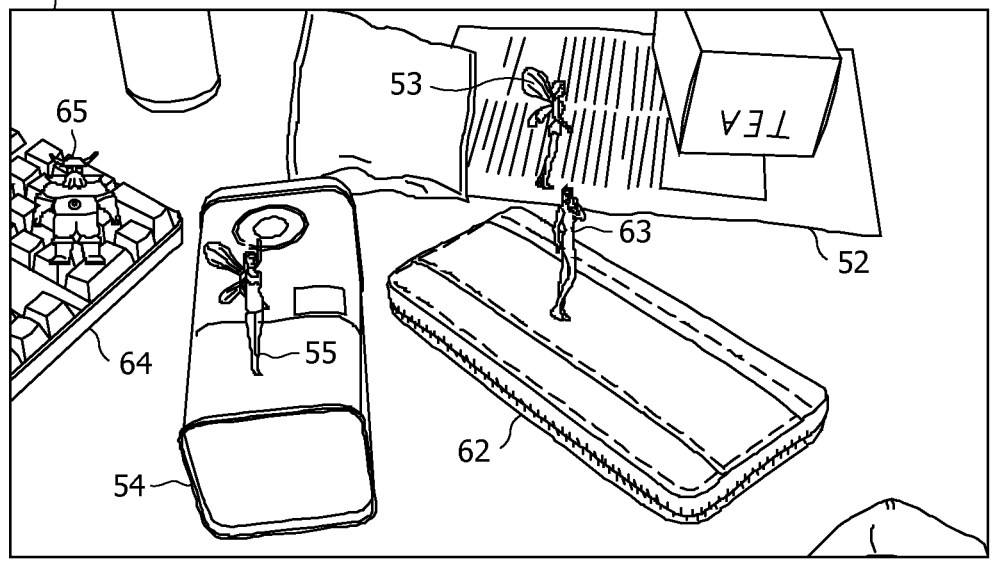

FIGS. 1-4 illustrate these points. FIGS. 1 and 3 show the views as seen by a camera used by User 1. FIGS. 2 and 4 show the views as seen by a camera used by User 2. In FIG. 1, User 1 has acquired a real world scene 50 which includes a magazine 52, a tin can 54, a wallet 62, and a keyboard 64. User 2 in FIG. 2 has acquired an image of the same real world scene but from a slightly different vantage point. User 2's real world scene is designated as 60. User 1 has inserted objects 53 and 55 into the real world scene 50 of FIG. 1. The objects 53, 55 in this example are fairies, but can be any other type of object. Object 53 has been inserted so as to be made to appear to be standing on the magazine 52, and object 55 has been inserted so as to appear to be standing on top of tin can 54. User 2, meanwhile, has inserted objects 63 and 65 into real world scene 60, with object 63 being made to appear to be standing on wallet 62, while object 65 being made to appear to be on the keyboard 64.

Users 1 and 2 can share their individually inserted objects. That is, User 1 can share her inserted objects 53 and 55 with User 2, and User can share his objects 63 and 65 with User 1. The shared results are shown in FIGS. 3 and 4. In FIG. 3, User 1 now sees a real world image 58 with all four objects—53, 55, 63, and 65. Similarly, User 2 now sees his own real world image 68 also with all four objects.

User 1 may have designated that object 53 is to remain static (i.e., immobile) while object 55 is to be made to dynamically move with tin can 54 as the tin can is moved about in the real world. Because these objects are shared with User 2, User 2 will view object 53 as remaining statically in place while object 55 will move if and when the tin can is physically moved. Similarly, User 2 may have specified that object 65 is to remain static while object 63 is to be made to dynamically move with wallet 62 as the wallet is moved about in the real world. Consequently, User 1 will view object 65 as remaining statically in place while object 63 will move if and when the wallet is physically moved.

Figure 5A:
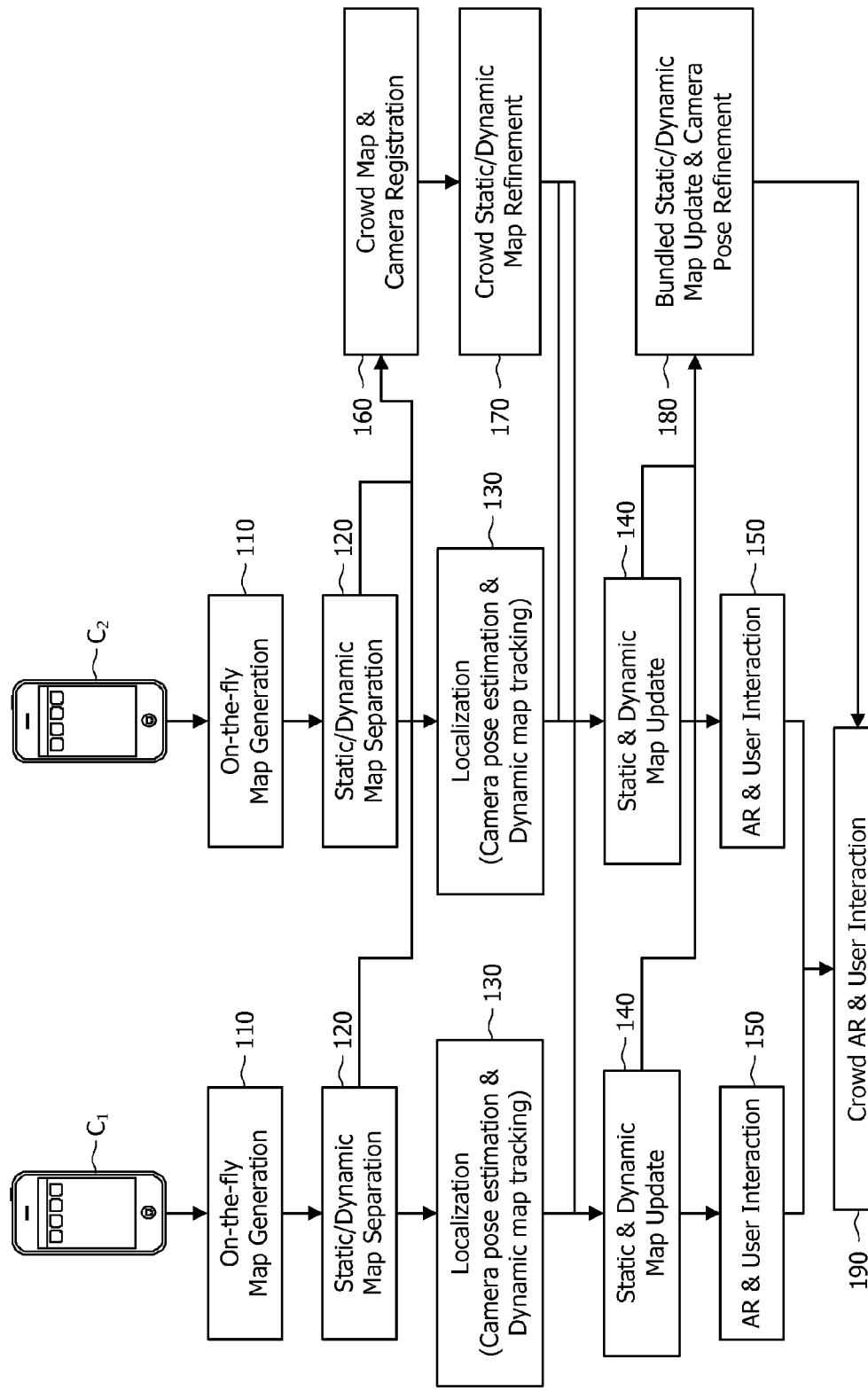
FIG. 5A illustrates the operations useful to provide a multiple user, multiple object AR experience in accordance with various embodiments.

FIG. 5A shows a system diagram which includes various modules which implement a multi-user, multi-object AR system. In some embodiments, the modules may be implemented by a processor executing a corresponding software module on a mobile camera. Two mobile cameras $C_1$ and $C_2$ are shown which will share AR objects. Cameras $C_1$ and $C_2$ may be the cameras used to capture and edit the images shown in FIGS. 1-4. To insert multiple AR objects, some of which are statically tied to the real world scene and other objects permitted to move with moving objects in the scene, each camera $C_1$, $C_2$ includes an on-the-fly map generation module 110, a static/dynamic map separation module 120, a localization module 130, a static and dynamic map update module 140, and a AR and user interaction module 150. The remaining modules—crowd map and camera registration module 160, crowd static/dynamic map refinement module 170, bundled static/dynamic map update and camera pose refinement module 180, and crowd AR and user interaction module 190—permit the mobile cameras $C_1$ and $C_2$ to share their inserted AR objects. Each such module will be explained below.

Figure 5B:
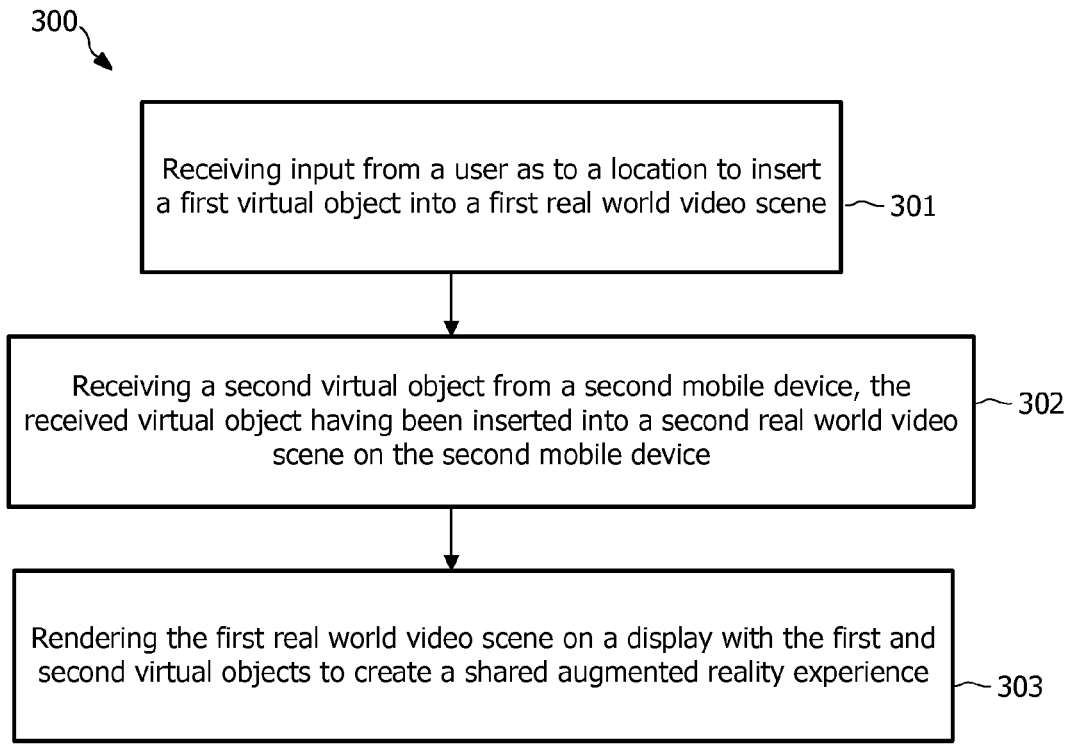
FIGS. 5B-5C illustrate an example of an AR method flowchart in accordance with various embodiments.

In accordance with various embodiments and with reference to FIG. 5B, an AR method 300 to create a shared augmented reality experience may comprise receiving a second virtual object from a second mobile device, the received virtual object having been inserted into a second real world video scene on the second mobile device 302, and rendering the first real world video scene on a display with a first virtual object and the second virtual object 303. In various embodiments, the AR method 300 may further comprise receiving input from a user or device as to a location to insert the first virtual object into a first real world video scene 301. The location of the first virtual object may be set by the user through a graphical user interface, where the user selects a point in the display to place the first virtual object. The user may also select an orientation of the first virtual object in the display. For example, and with reference to FIG. 1, the user may select to place the fairy object 53 on the magazine 52, and orientate the fairy facing to the right.

The first and second mobile devices may communicate with each other in various ways. For example, in various embodiments, the first and second mobile devices may be connected using one or more of a wired connection, or a wireless connection. The transmission technology may include sending data using Wi-Fi, near-field communication (NFC), Bluetooth®, cellular data, an infrared technology, or the like. The data sent by the second mobile device to the first mobile device may include data on the second virtual object, and location information such as the virtual object position and orientation. In accordance with various embodiments, the various virtual objects are set within a video scene. An alignment module can compute the rotation, a translation, and a scaling factor to align the viewpoints of multiple cameras. Once the relationship between the cameras is computed, the mapping of the individual devices is refined. An AR frame is generated by the respective mobile devices, and may be outputted to other mobile devices for creating a joint AR scene. The first mobile device receives the virtual object data from the second mobile device, and renders the second virtual object into the first real world video scene on the display using the provided 3D location and 3D orientation of the second virtual object. Various graphics rendering tools can be used for this purpose, such as the popular OpenGL.

Figure 5C:
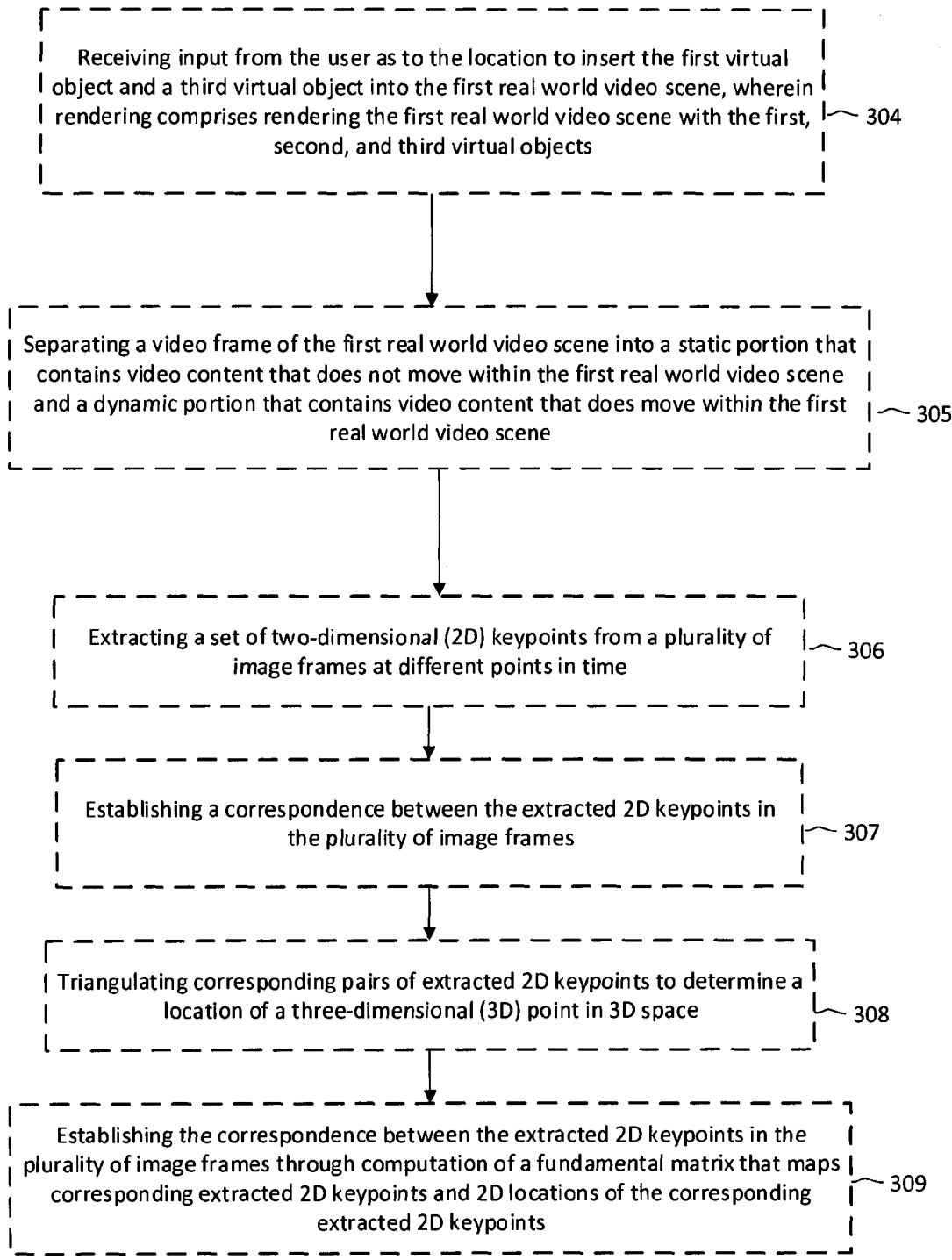

With reference to FIG. 5C, the method 300 may further comprise receiving input from the user or device as to the location to insert the first virtual object and a third virtual object into the first real world video scene 304. The rendering may include rendering the first real world video scene with the first, second, and third virtual objects. Furthermore, the method 300 may comprise separating a video frame of the first real world video scene into a static portion that contains video content that does not move within the first real world video scene and a dynamic portion that contains video content that does move within the first real world video scene 305.

Moreover, the method 300 may also comprise extracting a set of two-dimensional (2D) keypoints from a plurality of image frames at different points in time 306, establishing a correspondence between the extracted 2D keypoints in the plurality of image frames 307, and triangulating corresponding pairs of extracted 2D keypoints to determine a location of a three-dimensional (3D) point in 3D space 308. The method 300 may comprise establishing the correspondence between the extracted 2D keypoints in the plurality of image frames through computation of a fundamental matrix that maps corresponding extracted 2D keypoints and 2D locations of the corresponding extracted 2D keypoints 309.

Figure 6:
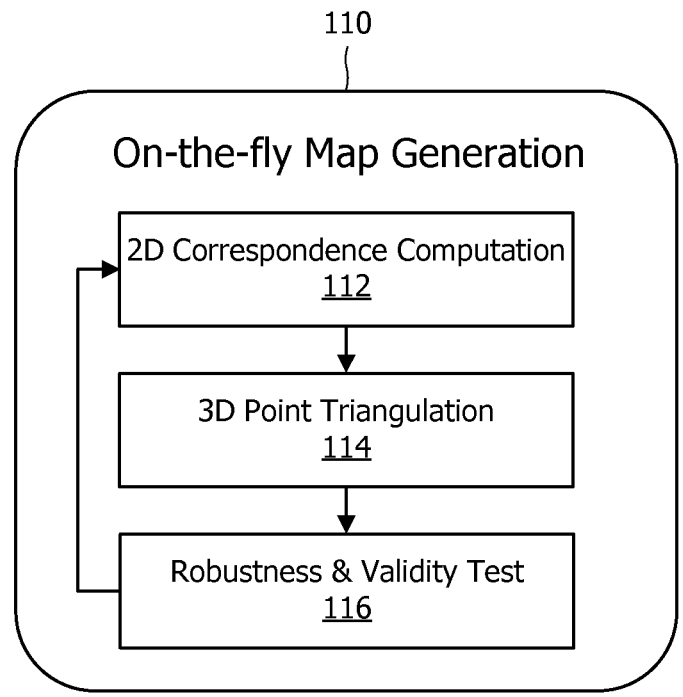
FIG. 6 illustrates an example of an On-the-Fly Map Generation module in accordance with various embodiments.
Figure 7:
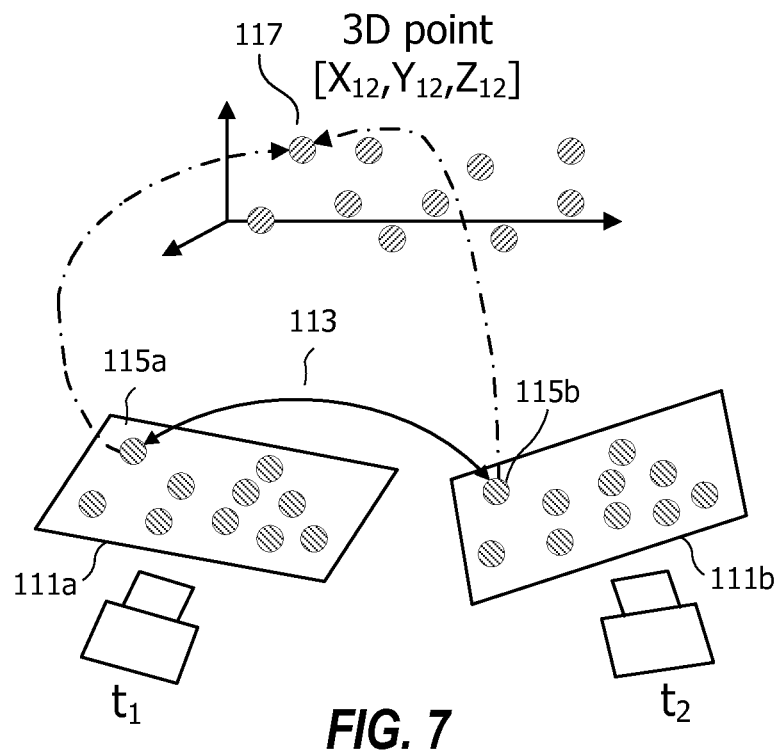
FIG. 7 illustrates the correspondence of 2D points between different frames and between the 2D frames and a 3D coordinate system in accordance with various embodiments.

FIGS. 6 and 7 illustrate an embodiment of the on-the-fly map generation module 110. When a mobile camera $C_i$ (e.g., mobile camera $C_1$ or $C_2$) starts the AR experience, the camera generates an initial map using its on-the-fly map generation operation 110. In the embodiment of FIG. 6, the on-the-fly map generation module 110 includes components 112, 114, and 116. The 2D Correspondence Computation component 112 extracts a set of 2D "keypoints" from two image frames $I_{i,t_1}$ and $I_{i,t_2}$ at times $t_1$ and $t_2$, respectively, and further establishes correspondences as a set of K matching keypoints $\Phi_i(t_1, t_2) = \{(p_{i,t_1}(k), p_{i,t_2}(k)) | k=1, \ldots, K\}$, where the keypoint $p_{i,t_1}(k)$ comes from frame $I_{i,t_1}$ and $p_{i,t_2}(k)$ come from frame $I_{i,t_2}$. Various types of keypoints can be used for this purpose, such as the Scale-Invariant Feature Transform (SIFT) descriptor, Speeded UP Robust Features (SURF) descriptor, Oriented Features from Accelerated Segment Test (FAST) and Rotated Binary Robust Independent Element Features (BRIEF) (ORB) descriptor, etc. computed over various local points of interest detected by a corner detector, blob detector, ridge detector, etc. Various methods can be used to establish the keypoint correspondences between successive frames based on the computed distances between the keypoint descriptors. Such techniques may include the nearest neighbor matching technique, the fast approximate nearest neighbor matching, etc.

FIG. 7 illustrates two frames 111a and 111b taken by the same mobile camera (e.g., cameras $C_1$ or $C_2$) at time points $t_1$ and $t_2$. The dots shown in each frame 111a and 111b represent the keypoints noted above. Corresponding keypoints between the two frames are determined as explained above. For example, arrow 113 indicates that keypoint 115a in frame 111a corresponds to keypoint 115b in frame 111b.

Referring back to FIG. 6, the 3D Point Triangulation Component 114, based on the matching keypoints $\Phi_i(t_1, t_2)$, computes a fundamental matrix $F_i(t_1, t_2)$. Let $[x_{i,t_j}(k), y_{i,t_j}(k)]$ denote the 2D location of keypoint $p_{i,t_j}(k)$ in frame $I_{i,t_j}$. The fundamental matrix connects the matching keypoints $p_{i,t_1}(k)$ from frame $I_{i,t_1}$ and $p_{i,t_2}(k)$ from frame $I_{i,t_2}$ by:

$$[x_{i,t_2}(k), y_{i,t_2}(k), 1] F_i(t_1, t_2) [x_{i,t_1}(k), y_{i,t_1}(k), 1]^T = 0$$

The fundamental matrix $F_i(t_1, t_2)$ can be computed from the equation above. Then, for each pair of keypoints $p_{i,t_1}(k)$ and $p_{i,t_2}(k)$, based on their 2D locations in the corresponding frames $[x_{i,t_1}(k), y_{i,t_1}(k)]$ and $[x_{i,t_2}(k), y_{i,t_2}(k)]$ as well as the fundamental matrix $F_i(t_1, t_2)$, a 3D point $P_i(k) = [X_i(k), Y_i(k), Z_i(k)]$ can be computed by the 3D Point Triangulation component 114, where $X_i(k), Y_i(k), Z_i(k)$ determines the location of the 3D point $P_i(k)$ in the real-world coordinate. FIG. 7 illustrates that the keypoints 115a and 115b map to a 3D point 117 in 3D space.

The Robustness and Validity Test component 116 in FIG. 6 subjects the triangulated points to a robustness and validity test process. The geometric correctness of the 3D points is verified. For example, the test may verify whether the 3D points are located in front of the corresponding camera $C_i$. Also, the reprojection error is tested to verify that the computed fundamental matrix and the triangulated 3D points are reliable, e.g., the frames $I_{i,t_1}$ and $I_{i,t_2}$ should have enough baseline. If the 3D points and fundamental matrix fail the tests, another set of two frames $I_{i_1}$ and $I_{i_2}$ are selected for processing by the on-the-fly map generation operation 110. In the end, the outputs of the on-the-fly map generation operation are a set of triangulated 3D points $P_i(k)$, $k=1, \ldots, K_i$.

Figure 8:
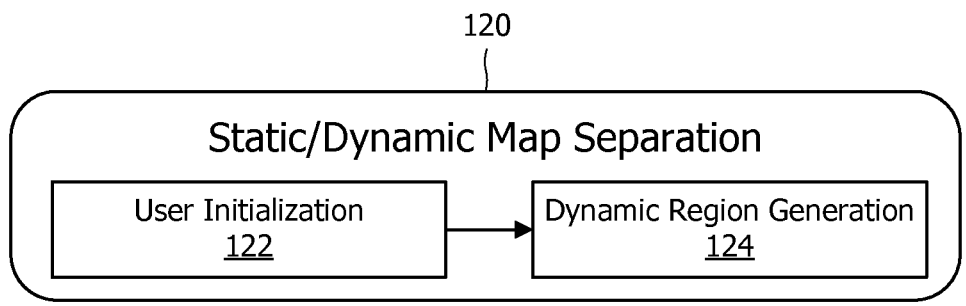
FIG. 8 illustrates an example of a Static/Dynamic Map Separation module in accordance with various embodiments.

The generated initial map (represented by the set of 3D points $P_i(k)$, $k=1, \ldots, K_i$) are provided to and operated on by the Static/Dynamic Map Separation module 120. This module separates the initial map points into different parts—a static initial map represented by a set of static 3D points $P_i^S(k)$, $k=1, \ldots, K_i^S$ assigned to the static environment scene, and a dynamic initial map represented by a set of dynamic 3D points $P_{ij}^D(k)$, $k=1, \ldots, K_{ij}^D$ assigned to the j-th real-world dynamic object. In the example of FIG. 8, the Static/Dynamic Map Separation module 120 comprises two components—a User Initialization component 122 and Dynamic Region Generation component 124. Given the initial map, the User Initialization component 122 asks the user to identify each of the dynamic moving objects. For example, if the user is taking a video and a car is passing by, the user can identify the car in the video as being the moving object. Various types of user interfaces can be used in this regard. For example, the user can draw a rough polygon to mark the rough region of the moving object on a touch sensitive display of the camera. After that, the 3D map points whose corresponding 2D keypoints fall within the user-defined region are considered as the dynamic 3D map points $P_{ij}^D(k)$, $k=1, \ldots, K_{ij}^D$ for the corresponding j-th moving object. The remaining 3D map points that do not fall into any user-defined dynamic region are considered as the static 3D map points $P_i^S(k)$, $k=1, \ldots, K_i^S$.

Figure 9:
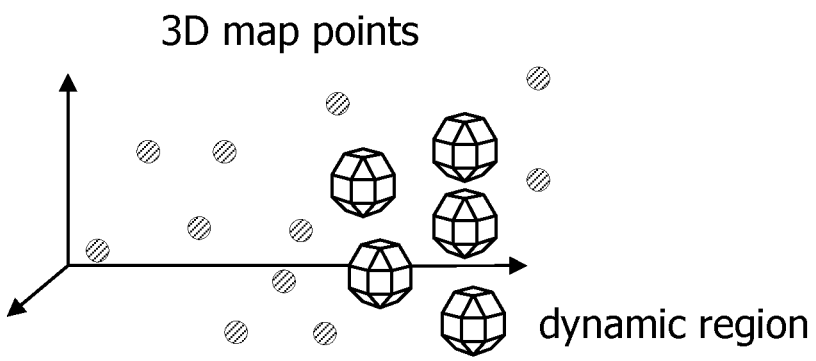
FIG. 9 illustrates the generation of polyhedrons around certain 3D map points in accordance with various embodiments.

For each dynamic 3D map point $P_{ij}^D(k)$, the Dynamic Region Generation component 124 forms a polyhedron $\Gamma_{ij}^D(k)$ centered at $P_{ij}^D(k)$, and the 3D polyhedral region within the polyhedron is considered as dynamic. A polyhedron is used here to approximate a 3D sphere representing the influence of the dynamic map point in the 3D region. All the polyhedrons $\Gamma_{ij}^D(k)$, $k=1, \ldots K_{ij}^D$ give the 3D dynamic region of the j-th object. FIG. 9 shows an example of polyhedrons formed around a subset of the 3D map points which correspond to the dynamically moving objects in the real world scene.

Figure 10:
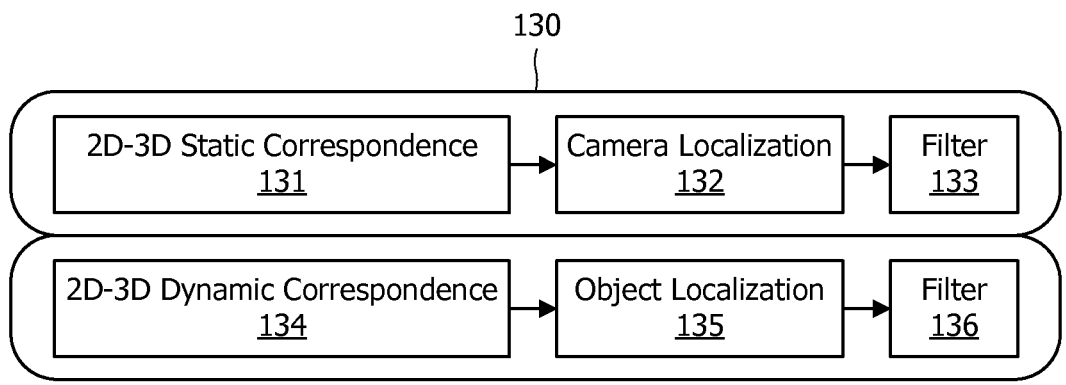
FIG. 10 illustrates an example of a Localization and Dynamic Map Tracking module in accordance with various embodiments.

Referring now to FIG. 10, for a new incoming frame $I_{i,t_l}$ at time $t_l$, the Localization module computes the 6 degree-of-freedom (DoF) camera pose of the frame $I_{i,t_l}$, including a camera rotation $R_{i,t_l}^C$ and a camera translation $T_{i,t_l}^C$ referenced to the real-world coordinate determined by the static environment map, as well as the 6 DoF pose of each of the dynamic objects, including an object rotation $R_{i,j,t_l}^O$ and an object translation $T_{i,j,t_l}^O$ referenced to the real-world coordination determined by the static environment map.

Figure 11:
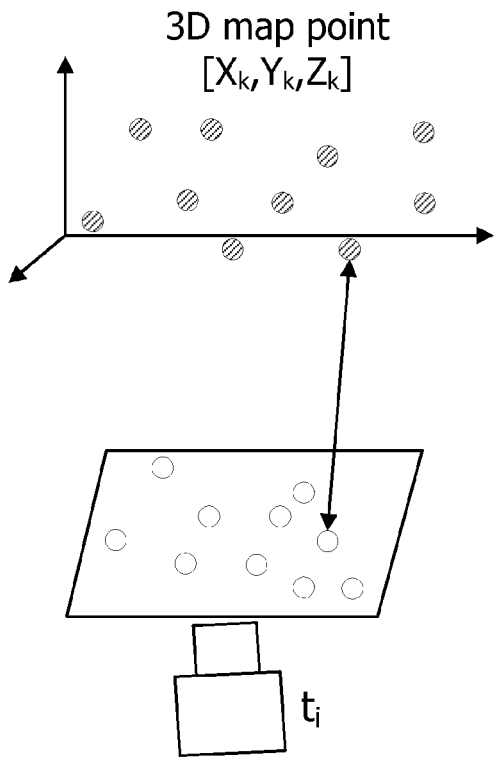
FIG. 11 illustrates correspondence between 2D points their 3D counterparts in accordance with various embodiments.

The Localization module 130 includes components that process the static portion of the frame and components that process the dynamic portion of the frame. The 2D-3D Static Correspondence module 131 computes a set of 2D keypoints from the static portion of frame $I_{i,t_l}$. The 2D-3D Static Correspondence module 131 then determines the correspondence between the 2D and 3D points: $\Theta_i^S(t_l)=\{(p_{i,t_l}^S(m),P_i^S(m))|m=1,\ldots,M_i^S\}$, where the keypoint $p_{i,t_l}^S(k)$ comes from frame $I_{i,t_l}$ and $P_i^S(m)$ is a 3D point in the static map $P_i^S(k)$, $k=1,\ldots,K_i^S$ matched to the keypoint. FIG. 11 shows an example of the correspondence between the 2D points and their 3D counterparts.

Various methods can be implemented by the 2D-3D Static Correspondence module 131 to find the 2D-3D correspondences based on the computed distances between the 2D keypoint descriptors and the descriptors of the 3D points, such as the brute force nearest neighbor matching, the fast approximate nearest neighbor matching, the lightweight pyramid feature tracking, etc. There are also various ways to compute the descriptors of the 3D points. For example, a 3D point can be simply be represented by a set of descriptors comprising the descriptors of the initial keypoints that triangulates to the 3D point, and the descriptors of the keypoints that match to the 3D point in the following frames. Also, a set of representative descriptors can be computed from this set of descriptors, e.g., through clustering methods, to represent the 3D point. Using similar methods, a set of 2D-3D correspondences can be established: $\Theta_{ij}^D(t_l)=\{(p_{i,j,t_l}^D(m),P_{ij}^D(m))|m=1,\ldots,M\}$, where the keypoint $p_{i,j,t_l}^D(k)$ comes from frame $I_{i,t_l}$ and $P_{ij}^D(m)$ is a 3D point in the dynamic map $P_{ij}^D(k)$, $k=1,\ldots,K_{ij}^D$ of the j-th dynamic object matched to the keypoint.

Referring to FIG. 10, the Camera Localization module 132 computes the 6 DoF camera pose $R_{i,t_l}^C$ and $T_{i,t_l}^C$ by solving, for example, the Perspective-n-Point problem (PnP problem) given the set of 2D-3D correspondences $\Theta_i^S(t_l)=\{(p_{i,t_l}^S(m),P_i^S(m))|m=1,\ldots,M_i^S\}$ and the camera intrinsic parameters including a camera intrinsic matrix $K_i$ and a set of lens distortion coefficients $D_i$. There are various ways to obtain $K_i$ and $D_i$. In some embodiments, $K_i$ and $D_i$ can be computed in a calibration pre-process using any suitable method. In other embodiments, some of the intrinsic parameters can be obtained from the camera manufacturer, and the remaining parameters can be computed through a calibration pre-process. Any of a variety of suitable methods can be used to solve the PnP problem to compute the 6 DoF camera pose $R_{i,t_l}^C$ and $T_{i,t_l}^C$.

The computed 6 DoF camera pose $R_{i,t_l}^C$ and $T_{i,t_l}^C$ are provided to a Filter 133. In a preferred embodiment, the filter is implemented as a Kalman filter. The Kalman filter 133 includes two stages: a prediction stage and a correction stage. In the prediction stage, the Kalman filter 133 uses the estimated statistics from the past-filtered 6 DoF camera poses $\{R_{i,t_j}^C, T_{i,t_j}^C | t_j < t_1\}$ to project a priori estimates for the current 6 DoF camera pose. In the correction stage, the Kalman filter 133 takes into account the new 6 DoF camera pose $R_{i,t_l}^C$ and $T_{i,t_l}^C$ and computes an improved a posteriori estimate of the 6 DoF camera pose $\tilde{R}_{i,t_l}^C$ and $\tilde{T}_{i,t_l}^C$. At the same time, the projection states are also updated based on the newly observed camera pose $R_{i,t_l}^C$ and $T_{i,t_l}^C$. In one embodiment, the Kalman filter 133 has 18 projection state parameters, corresponding to the 6 DoF camera pose, the speed of camera pose changes, and the acceleration of the camera pose changes. The refined camera pose $\tilde{R}_{i,t_l}^C$ and $\tilde{T}_{i,t_l}^C$ after Kalman filtering are smoother than the original pose $R_{i,t_l}^C$ and $T_{i,t_l}^C$, i.e., the small error in the original pose from solving the PnP problem are smoothed out.

In other embodiments, an Inertial Measurement Unit (IMU) may be included in the mobile camera. An IMU may include one or more sensors, such as a gyroscope, an accelerometer, and/or magnetometer. The gyroscopes and accelerometers may be single or multi-axis devices. By combining the outputs of such sensors, the IMU provides the 6 DoF camera pose estimation $R_{i,t_l}^{IMU}$ and $T_{i,t_l}^{IMU}$ of the current camera $C_i$ at the current time $t_l$. Using both $R_{i,t_l}^C$ and $T_{i,t_l}^C$, and $R_{i,t_l}^{IMU}$ and $T_{i,t_l}^{IMU}$, the refined camera pose $\tilde{R}_{i,t_l}^C$ and $\tilde{T}_{i,t_l}^C$ can be computed through, for example, suitable extended Kalman filtering algorithms.

For the dynamic portion of the frame, a 2D-3D Dynamic Correspondence component 134 computes a set of 2D keypoints from the dynamic portion of frame $I_{i,t_l}$ and then determines the correspondence between the 2D and 3D points as described above. Further, for each dynamic object, a 6 DoF object pose $\overline{R}_{i,j,t_l}^O$ and $\overline{T}_{i,j,t_l}^O$ is computed by the Object Localization module 132 by solving the Perspective-n-Point problem (PnP problem) given the set of 2D-3D correspondences $\Theta_{ij}^D(t_1)=\{(p_{i,j,t_l}^D(m),P_{ij}^D(m))|m=1\ldots M\}$ and the camera intrinsic parameters $K_i$ and $D_i$. $\overline{R}_{i,j,t_l}^O$ and $\overline{T}_{i,j,t_l}^O$ are object rotation and translation, respectively, referenced to the world-coordinate where the dynamic moving object is considered as static. Therefore, in the static real-world coordinate system, the object rotation $R_{i,j,t_l}^O$ and object translation $T_{i,j,t_l}^O$ can be computed as:

$$R_{i,j,t_l}^O = (R_{i,t_l}^C)^{-1} \overline{R}_{i,j,t_l}^O$$

$$T_{i,j,t_l}^O = (R_{i,t_l}^C)^{-1} (\overline{T}_{i,j,t_l}^O - T_{i,t_l}^C)$$

Using the similar approach, each computed 6 DoF object pose and $R_{i,j,t_l}^O$ and $T_{i,j,t_l}^O$ are provided to a filter 136. Filter 136 may be the same (Kalman) or similar as that described above regarding filter 133. In the prediction stage, the filter 136 uses the estimated statistics from the past-filtered 6 DoF object poses $\{R_{i,j,t_j}^O, T_{i,j,t_j}^O | t_j < t_l\}$ to project a priori estimate for the current 6 DoF object pose. In the correction stage, the Kalman filter takes into account the new 6 DoF object pose $R_{i,j,t_l}^O$ and $T_{i,j,t_l}^O$ and computes an improved a posteriori estimate of the 6 DoF object pose $\tilde{R}_{i,j,t_1}^O$ and $\tilde{T}_{i,j,t_1}^O$. The projection states also may be updated based on the newly observed object pose $R_{i,j,t_l}^O$ and $T_{i,j,t_l}^O$. The refined object pose $\tilde{R}_{i,j,t_l}^O$ and $\tilde{T}_{i,j,t_l}^O$ after Kalman filtering are smoother than the original pose $R_{i,j,t_l}^O$ and $T_{i,j,t_l}^O$, i.e., the small error in the original pose from solving the PnP problem are smoothed out.

Referring back to FIG. 5, after localization by the Localization module 130, the Static and Dynamic Map Update module 140 updates the map in several different ways given the computed 2D-3D correspondences $\Theta_i^S(t_l)=\{(p_{i,t_l}^S(m),P_i^S(m))|m=1,\ldots,M_i^S\}$, $\Theta_{ij}^D(t_l)=\{(p_{i,j,t_l}^D(m),P_{ij}^D(m))|m=1,\ldots,M\}$, the refined camera pose $\tilde{R}_{i,t_l}^C$ and $\tilde{T}_{i,t_l}^C$, and the refined object pose $\tilde{R}_{i,j,t_l}^O$ and $\tilde{T}_{i,j,t_l}^O$. First, for each existing 3D point in the map, if a 2D keypoint is matched to that particular 3D point, the descriptor of the matching 2D keypoint is used to update the descriptor representation of the 3D point. In some embodiments, the 3D location of the 3D point is also updated based on the new matching 2D keypoint. There are various ways to perform such an update. For example, a candidate 3D location can be triangulated using each pair of 2D keypoints corresponding to the 3D point, and the final 3D location of the 3D point can be some statistics (e.g., statistical mean) computed from these candidates.

A dynamic map addition process also is conducted for each dynamic object map. The dynamic map update need not occur with every frame and can be performed once in a while, for example, after the object pose has changed by more than a threshold amount and the current frame time is substantially different (e.g., by more than threshold) from the last time the map addition process was performed. In the dynamic map addition process, the set of 3D polyhedron $\Gamma_{ij}^D(k)$, $k=1, \ldots, K_j^D$ of the j-th dynamic object are first projected on to the 2D imaging plane in three steps: (1) each vertex $V_{ij}^D(k)=[X_{ij}^D(k),Y_{ij}^D(k),Z_{ij}^D(k)]$ of each polyhedron $\Gamma_{ij}^D(k)$ are projected to the 2D imaging plane of the current frame by using:

$$\alpha[x_{i,j,t_l}^D(k),y_{i,j,t_l}^D(k),1]^T = K_i[\tilde{R}_{i,j,t_l}^D|\tilde{T}_{i,j,t_l}^D][X_{ij}^D(k),Y_{ij}^D(k),Z_{ij}^D(k),1]^T;$$

A convex hull is computed by the Static and Dynamic Map Update module 140 based on the projected 2D points of the vertices of the polyhedron $\Gamma_{ij}^D(k)$. Regions in the convex hull are considered as a candidate moving object region of the j-th object contributed by the 3D dynamic polyhedron $\Gamma_{ij}^D(k)$. All of the convex hull regions computed from all the polyhedrons are weighted and combined together to obtain the dynamic region of the j-th dynamic object in the current frame $\Pi_{i,j,t_l}^O$, where pixels in the dynamic region $\Pi_{i,j,t_l}^O$ are each assigned a weight, denoting the possibility of each pixel being a part of the dynamic object. Then a set of 2D keypoint correspondences $$\Phi_{ik}^D(t_n,t_l) = \{(p_{i,j,t_l}^D(q),p_{i,j,t_l}^D(\backslash q))|q=1,\ldots, Q_{ij}^D, p_{i,j,t_l}^D(q) \notin \Theta_{ij}^D(t_l), p_{i,j,t_l}^D(q) \in \Pi_{i,j,t_l}^O\}$$

are computed between the current frame $I_{i,t_l}$ and the last frame of conducting the last map addition process $I_{i,t_n}$ (with corresponding object pose $\tilde{R}_{i,j,t_n}^O$ and $\tilde{T}_{i,j,t_n}^O$). Each keypoint $p_{i,j,t_l}^D(q) \in \Phi_{ij}^D(t_n,t_l)$ falls into the dynamic region and does not have a matching 3D point in $\Theta_{ij}^D(t_l)$. Then, for each pair of the matched 2D keypoints $(p_{i,j,t_n}^D(q),p_{i,j,t_l}^D(q))$, a 3D point $P_{ij}^D(q)=[X_{ij}^D(q),Y_{ij}^D(q),Z_{ij}^D(q)]$ can be triangulated based on the object poses $\tilde{R}_{i,j,t_l}^O$ and $\tilde{T}_{i,j,t_l}^O$, and $\tilde{R}_{i,j,t_n}^O$ and $\tilde{T}_{i,j,t_n}^O$, and the camera intrinsic parameters $K_i$ and $D_i$. Then, those 3D points that satisfy:

$$\lambda p_{i,j,t_l}^D(q) = k_i(\tilde{R}_{i,j,t_l}^D P_{ij}^D(q) + \tilde{T}_{i,j,t_l}^D),$$

are geometrically correct (e.g., in front of the cameras and have small re-projection errors) and are added into the dynamic map by the Static and Dynamic Map Update module 140.

The Static and Dynamic Map Update module 140 also performs a static map addition process once in a while, for example, after the camera pose has changed by more than a threshold amount and the current frame time is substantially different from the last time the map addition process was performed (i.e., the time difference is more than another threshold). In the static map addition process, a set of 2D keypoint correspondences:

$$\Phi_i^S(t_n,t_l) = \{(p_{i,t_l}^S(q))|q=1,\ldots, Q_i^S, p_{i,t_n}^S(q) \notin \Theta_i^S(t_l), p_{i,t_n}^S(q) \notin \Pi_{i,j,t_l}^O, j=1,\ldots,J\}$$

are computed between the current frame $I_{i,t_l}$ and the last frame of conducting the last map addition process $I_{i,t_n}$ (with corresponding camera pose $\tilde{R}_{i,t_n}^C$ and $\tilde{T}_{i,t_n}^C$), where each keypoint $p_{i,t_n}^S(q) \in \Phi_i^S(t_n,t_l)$ does not fall into any of the dynamic object regions $\Pi_{i,j,t_l}^O$, $j=1,\ldots,J$, and have a matching 3D point in $\Theta_i^S(t_l)$. Then, for each pair of matched 2D keypoints $(p_{i,t_n}^S(q),p_{i,t_l}^S(q))$, a 3D point $p_i^S(q)=[X_i^S(q),Y_i^S(q),Z_i^S(q)]$ can be triangulated based on the camera poses and $\tilde{R}_{i,t_l}^C$ and $\tilde{T}_{i,t_l}^C$, and $\tilde{R}_{i,t_n}^C$ and $\tilde{T}_{i,t_n}^C$, and the camera intrinsic parameters $K_i$ and $D_i$. Then, those 3D points that satisfy:

$$\lambda p_{i,t_l}^S(q) = K_i(\tilde{R}_{i,t_l}^S P_i^S(q) + \tilde{T}_{i,t_l}^C),$$

are geometrically correct (e.g., in front of the cameras and have small re-projection errors) and are added into the static map.

Finally, those 3D points in the map that have not been used for a long time (not been updated for a period of time more than a threshold) are removed from the map. By removing relatively unused points, the computational cost of maintaining a larger map is reduced.

Figure 12:
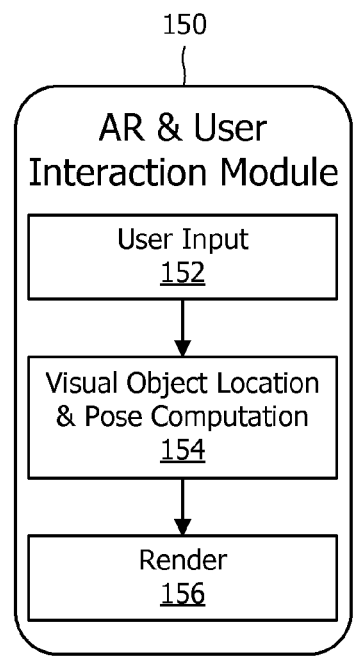
FIG. 12 shows an example of an AR and User Interaction module in accordance with various embodiments.

An example of the AR and User Interaction module 150 is illustrated in FIG. 12 and includes a User Input component 152, a Virtual Object Location and Pose Computation component 154, and a Render module 156. User inputs are received by the User Input module. Such inputs may include the 3D orientation $R_{i,s}^v$ and 3D location $T_{i,s}^v$ of the s-th virtual object, and the assignment of the object $a_{i,s}^v$ indicating whether the virtual object is static: $a_{i,s}^v=0$, or follow the movement of the j-th object: $\lambda_{i,s}^v=j$, $j>0$, $s=1,\ldots,S$, the AR & User Interaction module 150 generates the AR frame output for the user. In one example, when the user inputs a 2D location for a virtual object, the Virtual Object Location and Pose Computation component 154 automatically converts the 2D location to a 3D location by interpolating the nearest 3D points (whose corresponding 2D keypoints are closest to the 2D location input) in the corresponding map (the static map when $a_{i,s}^v=0$ and the j-th dynamic map when $a_{i,s}^v=j$, $j>0$). In a preferred embodiment, a user interface is used to let user choose (e.g., via a touch sensitive display on the mobile camera) and adjust the locations and orientations of the inserted virtual objects. After that, based on the 3D orientation $R_{i,s}^v$ and 3D location $T_{i,s}^v$ of the virtual object, as well as the 6 DoF camera pose $\tilde{R}_{i,t_l}^C$ and $\tilde{T}_{i,t_l}^C$ when $a_{i,s}^v=0$ or the 6 DoF object pose $\tilde{R}_{i,j,t_l}^O$ and $\tilde{T}_{i,j,t_l}^O$ when $a_{i,s}^v=j$, $j>0$, the virtual object can be rendered by the Render module 156 into the real-world scene and presented to the user on the display of the mobile camera. Various graphics rendering tools can be used for this purpose, such as the popular OpenGL.

In some cases, not only may users of mobile cameras want to insert multiple virtual objects into a real world scene to create an individual AR experience for each such user, but the multiple users may want to share their inserted virtual objects to thereby create a shared AR experience. In various embodiments, a user of a mobile camera $C_i$ can share virtual objects inserted by that user with a user of another mobile camera $C_n$. Let $R_{i,s_i}^v$ and $T_{i,s_i}^v$, $s_i=1,\ldots,S_i$ denote the 3D orientation and location of the virtual objects manipulated by user of camera and $R_{n,s_n}^v$ and $T_{n,s_n}^v$, $s_n=1,\ldots,S_n$ denote the 3D orientation and location of the virtual objects manipulated by user of camera $C_j$. The embodiment of FIG. 5 allows users to interact with the objects from other users on their own device through the Crowd AR & User Interaction module 190. To enable this functionality, three modules are used in at least some embodiments and are described in detail below.

Figure 13:
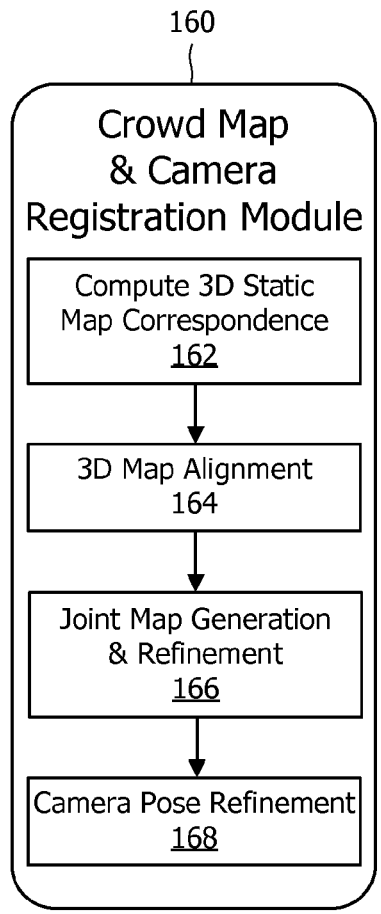
FIG. 13 shows an example of a Crowd Map and Camera Registration module in accordance with various embodiments.

One such module is the Crowd Map & Camera Registration module 160, which is further illustrated in FIG. 13. As shown in the example of FIG. 13, the Crowd Map & Camera Registration module 160 includes four components. Given the static map of camera $C_i$: 3D points $P_i^S(k_i)$, $k_i=1,\ldots,K_i^S$ and the static map of camera $C_n$: 3D points $P_n^S(k_n^S)$, $k_n=1,\ldots,K_n^S$ a Compute 3D Static Map Correspondence component 162 computes a set of 3D-3D correspondences $\{(P_i^S(q),P_n^S(q))|q=1,\ldots,Q\}$. Various methods can be used to obtain the 3D-3D correspondences based on the distances computed using the descriptors of the 3D points, such as the brute force nearest neighbor matching, the fast approximate nearest neighbor matching, etc. When there are enough 3D-3D correspondences (i.e., the number exceeds a threshold), a 3D Map Alignment component 164 computes a rotation $R_{in}^{3D}$, a translation $T_{in}^{3D}$, and a scaling factor $s_{in}^{3D}$ to align the static maps of camera $C_i$ and camera $C_n$. The $R_{in}^{3D}$, $T_{in}^{3D}$, and $s_{in}^{3D}$ are computed by solving the following problem:

$$\min_{s_{in}^{3D}, R_{in}^{3D} \in \Omega, T_{in}^{3D}} \sum_{q=1}^{Q} \left\| s_{in}^{3D} R_{in}^{3D} [X_i(q), Y_i(q), Z_i(q)]^T + T_{in}^{3D} - [X_n(q), Y_n(q), Z_n(q)]^T \right\|^2$$

where $(X_i(q), Y_i(q), Z_i(q))$ are the 3D location of the 3D point $P_i^S(q)$, and $\Omega = \{R_{in}^{3D} | R_{in}^{3D^T} R_{in}^{3D} = R_{in}^{3D} R_{in}^{3D^T} = I_3; \det(R_{in}^{3D}) = 1\}$ is the set of rotation matrices. The above is a least square optimization problem, which can be solved through Singular Vector Decomposition (SVD).

After the map alignment by the 3D Map Alignment Component 164, the Joint Map Generation and Refinement component 166 generates a joint map represented by a set of 3D points $\{P_{in}(k_{in})|k_{in}=1, \ldots, K_{in}\}$. In one embodiment, the joint map is created from the 3D points in the 3D-3D correspondences $\{(P_i^S(q), P_n^S(q))|q=1, \ldots, Q\}$ where each $P_{in}(k_{in}) = \text{average}(P_i^S(k_{in}), P_n^S(k_{in}))$ and $P_{in}(k_{in})$ is geometrically correct (e.g., with small re-projection error). Each 3D point $P_{in}(k_{in})$ in the joint map is also associated with a weight $w_{in}(k_{in})$ representing the reliability of the 3D point. The weight is determined based on the robustness of the point (i.e., re-projection error), and the visibility of the 3D point (i.e., the amount of time the point is visible in both cameras).

The Camera Pose Refinement component 168 re-computes the corresponding camera pose of camera $C_i$ and camera $C_n$ based on the weighted joint map by solving a weighted PnP problem:

$$\min_{\hat{R}_{i,t}^C \in \Omega, \hat{T}_{i,t}^C} \sum_{k_n=1}^{K_{in}} w_{in}(k_{in}) \left\| K_i [\hat{R}_{i,t}^C | \hat{T}_{i,t}^C][X_{in}(k_{in}), Y_{in}(k_{in}), Z_{in}(k_{in}), 1]^T - \lambda_k [x_{i,t}^s(k_{in}), y_{i,t}^s(k_{in}), 1]^T \right\|^2$$

where $\hat{R}_{i,t}^C$ and $\hat{T}_{i,t}^C$ are the target re-computed pose of camera $C_i$, $x_{i,t}^s(k_{in}), y_{i,t}^s(k_{in})$ corresponds to the 2D keypoint of the frame at time t matched to the static map point of camera $C_n$ that generates the joint map point $P_{in}(k_{in})$ (with 3D coordinates $X_{in}(k_{in}), Y_{in}(k_{in}), Z_{in}(k_{in})$), and t is the time for map and user registration.

In some embodiments, pairwise joint maps are generated for each pair of cameras to reduce the computation and storage costs of maintaining large joint maps. In other embodiments, joint maps can be generated over larger groups of users with a group size greater than two. For larger group sizes, similar processes can be used for crowd map and user registration, albeit with a higher computation and storage cost.

After the relationship between camera $C_i$ and camera $C_n$ has been computed and the joint map has been built, a Crowd Static/Dynamic Map Refinement module 170 (FIG. 5) is used to refine the static and dynamic maps of each individual camera. Given the set of 3D polyhedrons $\Gamma_{ij}^D(k)$, $k=1, \ldots, K_{ij}^D, j=1, \ldots, J_i$ of camera $C_i$ and $\Gamma_{nj}^D(k)$, $k=1, \ldots, K_{nj}^D, j=1, \ldots, J_n$ of camera $C_n$, a dynamic region of camera $C_n$ influencing camera $C_i$ is computed by the Crowd Static/Dynamic Map Refinement module 170 as explained below.

The Crowd Static/Dynamic Map Refinement module 170 projects each vertex $V_{nj}^D(k) = [X_{nj}^D(k), Y_{nj}^D(k), Z_{nj}^D(k)]$ of each polyhedron $\Gamma_{nj}^D(k)$ onto the 2D imaging plane of the current frame of camera $C_i$ by using:

$$\alpha[x_{i,j,t_l}^D(k), y_{i,j,t_l}^D(k), 1]^T = K_i[\tilde{R}_{i,j,t_l}^D(n \rightarrow i)][X_{ij}^D(k), Y_{ij}^D(k), Z_{ij}^D(k), 1]^T$$

where: $\tilde{R}_{i,j,t_l}^D(n \rightarrow i) = s_{ni}^{3D} R_{ni}^{3D} \tilde{R}_{n,j,t_l}^O$ and $\hat{T}_{i,j,t_l}^D (n \rightarrow i) = s_{ni}^{3D} R_{ni}^{3D} \hat{T}_{n,j,t_l}^O + T_{ni}^{3D}$.

The Crowd Static/Dynamic Map Refinement module 170 then computes a convex hull based on the projected 2D points of the vertices of the polyhedron $\Gamma_{nj}^D(k)$. Regions in the convex hull then are considered as candidate moving object regions of the j-th object of camera $C_n$ contributed by the 3D dynamic polyhedron $\Gamma_{nj}^D(k)$. All of the convex hull regions computed from all of the polyhedrons $\Gamma_{nj}^D(k)$, $k=1, \ldots, K_{nj}^D, j=1, \ldots, J_n$ are weighted and combined together to obtain the dynamic region of the dynamic objects of camera $C_n$ in the current frame of camera $C_i$: $\Pi_{i,t_l}(n \rightarrow i)$, where pixels in the dynamic region $\Pi_{i,j}^O(n \rightarrow i)$ are each assigned a weight denoting the possibility of each pixel being a part of the dynamic region.

The Remove Dynamic Map Points in Static Maps component 172 then remove those 3D maps points of camera $C_i$ whose corresponding 2D keypoints falls into the dynamic region $\Pi_{i,t_l}^O(n \rightarrow i)$ from the dynamic map of camera $C_i$. A similar process is performed to compute the dynamic region $\Pi_{n,t_l}^O(i \rightarrow n)$ and those 3D maps points of camera $C_n$ whose corresponding 2D keypoints falls into the dynamic region $\Pi_{n,t_l}^O(i \rightarrow n)$ are removed from the dynamic map of camera $C_n$.

Figure 14:
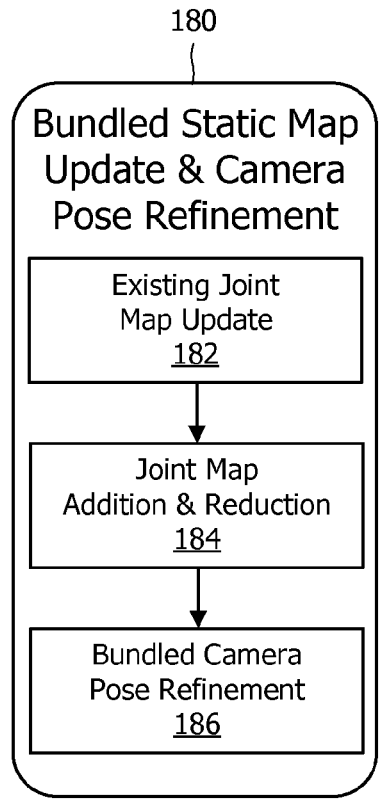
FIG. 14 shows an example of a Bundled Static Map Update and Camera Pose Refinement module in accordance with various embodiments.

Referring still to FIG. 5, the Bundled Static/Dynamic Map Update and Pose Refinement module 180 operates every M frames. M is automatically adjusted from time to time during the Crowd AR experience based on the movement of camera $C_i$ and camera $C_n$. For example, The Bundled Static/Dynamic Map Update and Pose Refinement module 180 makes M larger the slower the cameras $C_i$ and $C_n$ move. An example of the Bundled Static/Dynamic Map Update and Pose Refinement module 180 is illustrated in FIG. 14. The module 180 includes an Existing Joint Map Update component 182 which performs a similar map update to that described above in a single camera process for existing joint map updates. The new descriptor of the new 2D keypoint corresponding to the matched 3D point in the joint map is used to update the descriptor of that 3D point. The module 180 also includes a Joint Map Additional and Reduction component 184 which performs a similar map addition and reduction to that described above for the single-camera process. For example, the newly triangulated 3D points, which are not in the joint map and are geometrically correct and robust, are added into the joint map. Also, the map points that have not been used for a long period of time (more than a threshold period of time) are removed from the joint map. The Bundled Static Map Update and Camera Pose Refinement component 186 updates the weights of the updated joint map points for the bundled camera pose refinement, and the corresponding 6 DoF camera poses of camera $C_i$ and camera $C_n$ are re-computed by solving the weighted PnP problem described above using, the equation:

$$\min_{\hat{R}_{i,t}^C \in \Omega, \hat{T}_{i,t}^C} \sum_{k_n=1}^{K_{in}} w_{in}(k_{in})$$

-continued $$\left\| K_i [\hat{R}_{i,t}^C | \hat{T}_{i,t}^C] [X_{in}(k_{in}), Y_{in}(k_{in}), Z_{in}(k_{in}), 1]^T - \lambda_k [x_{i,t}^s(k_{in}), y_{i,t}^s(k_{in}), 1]^T \right\|^2$$

Given the 3D orientation $R_{i,s_i}^v$ and 3D location T of the $s_i$-th virtual object of camera $C_i$, and the assignment of the object $a_{i,s_i}^v$ indicating whether the virtual object is static: $a_{i,s_i}^v=0$, or follows the movement of the $j_i$-th object: $a_{i,s_i}^v=j_i$, $j_i>0$, $s_i=1, \ldots, S_i$, as well as the 3D orientation $R_{n,s_n}^v$ and 3D location $T_{n,s_n}^v$ of the $s_n$-th virtual object of camera $C_n$, and the assignment of the object $a_{n,s_n}^v$ indicating whether the virtual object is static: $a_{n,s_n}^v=0$, or follows the movement of the $j_n$-th object: $a_{n,s_n}^v=j_n$,$j_n>0$, $s_n=1, \ldots, S_n$ the Crowd AR and User Interaction module 190 (FIG. 5) generates the AR frame output for the users. In some embodiments, based on $R_{i,s_i}^v$, $T_{i,s_i}^v$, $a_{i,s_i}^v$, $R_{n,s_n}^v$, $T_{n,s_n}^v$, $a_{n,s_n}^v$, as well as the 6 DoF camera pose $R_{i,t_i}^C$, $T_{i,t_i}^C$ and $R_{n,t_l}^C$, $T_{n,t_l}^C$, when $a_{n,s_n}^v=0$, the 3D orientation and location of the inserted static object $s_n$ of camera $C_n$ are transferred to the 3D world coordinate of camera $C_i$, resulting in new orientation and location $R_{n,s_n}^v(i)$ and $T_{n,s_n}^v(i)$:

$$R_{n,s_n}^v(i)=R_{n,s_n}^v \cdot (R_{ni}^{3D})^{-1}$$

$$T_{n,s_n}^v(i)=s_{ni}^{3D}R_{ni}^{3D}T_{n,s_n}^v+T_{ni}^{3D}$$

When $a_{n,s_n}^v=j_n$, $j_n>0$, the 3D orientation and location of the inserted dynamic object $s_n$ of camera $C_n$ is transferred to the 3D world coordinate of camera $C_i$, resulting in new orientation and location $R_{n,s_n}^v(i)$ and $T_{n,s_n}^v(i)$:

$$R_{n,s_n}^v(i)=(\tilde{R}_{n,t_l}^C)^{-1}R_{n,s_n}^v(R_{ni}^{3D})^{-1}$$

$$T_{n,s_n}^v(i)=s_{ni}^{3D}R_{ni}^{3D}(\tilde{R}_{n,t_l}^C)^{-1}(T_{n,s_n}^v-\tilde{T}_{n,t_l}^C)+T_{ni}^{3D}$$

After that, the objects originated by camera and the objects transferred from camera $C_n$ can be rendered on a display (e.g., the display of mobile camera $C_i$). This operation also performed by the Crowd AR and User Interaction module 190. Similarly, the objects originated by camera $C_n$, and the objects transferred from camera $C_i$ can be rendered on a display (e.g., the display of mobile camera $C_n$). Various graphics rendering tools can be used for this purpose, such as the popular OpenGL software.

Figure 15:
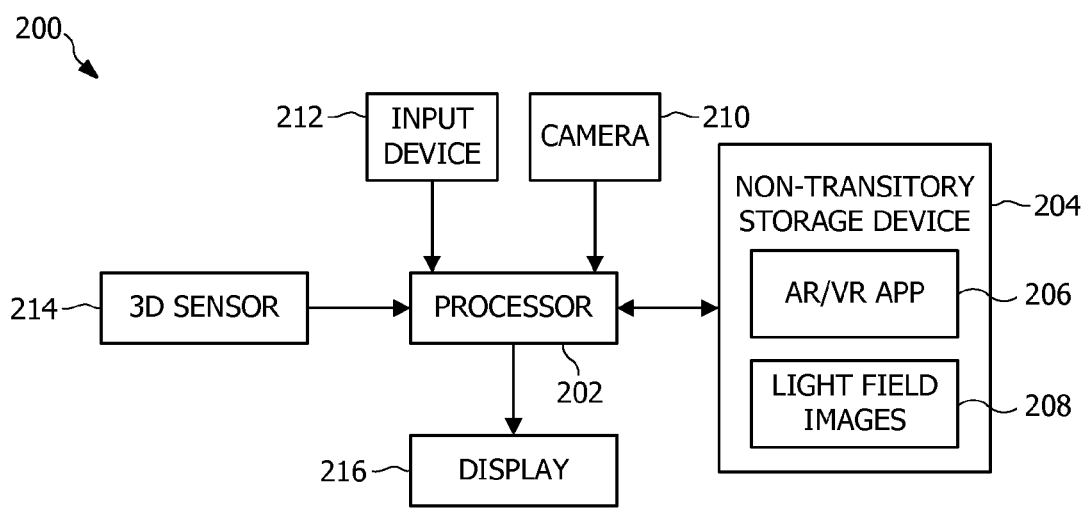
FIG. 15 shows a block diagram of mobile device usable in a multi-object, multi-user AR environment in accordance with various examples.

FIG. 15 shows an example of a block diagram of a mobile device 200 usable as described herein. The mobile device 200 includes a processor 202, a non-transitory storage device 204, a camera 210 (e.g., cameras $C_1$ or $C_2$), an input device 212, a 3D sensor 21, and a display 216. The non-transitory storage device 204 may include volatile storage (e.g., random access memory), non-volatile storage (e.g., solid state storage, magnetic storage, optical storage, etc.), or a combination of both volatile and non-volatile storage. The non-transitory storage device 204 may be implemented as a single storage device or multiple storage devices. The non-transitory storage device 204 includes an AR/VR application 206 which comprises multiple instructions that are executable by processor 202. When executed, the AR/VR application 206 causes the processor 202 to perform some or all of the functions described above as attribute to the mobile camera.

The input device 212 may be any type of user input device such as a keypad, keyboard, mouse, touchpad, etc. In an embodiment in which the mobile device 200 is an integrated computing device such as a smart phone, tablet device, and the like, the input device 212 and the display 216 may be implemented as a single touch sensitive display. The input device 212 in such embodiments may be the touch sensitive display itself. The 3D sensor 214 may include a single or multi-axis accelerometer, a single or multi-axis gyroscope, or any other type of 3D sensor.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A mobile device, comprising:
   a processor coupled to a display, wherein the processor is configured to:
      generate a first augmented reality scene comprising at least a first virtual object positioned at a first location in a real world scene;
      receive data comprising at least a second virtual object from a second mobile device, the received second virtual object having been inserted into the real world scene of a second augmented reality scene on the second mobile device, wherein the data includes location information indicating a second location of the second virtual object within the real world scene in the second augmented reality scene; and
      render a shared augmented reality scene on the display, wherein the shared augmented reality scene comprises both the first virtual object positioned at the first location in the real world scene and the received second virtual object positioned at the second location in the real world scene, wherein at least one of the first virtual object and the second virtual object is a dynamic virtual object that is dynamically inserted in the shared augmented reality scene to enable movement of the dynamic virtual object with real moving objects in the real world scene.

2. The mobile device of claim 1, wherein the processor is configured to:
   receive a first input as to 6 degree-of-freedom (DoF) poses to insert a third virtual object into the real world scene; and
   render the real world scene on the display with the first virtual object, the second virtual object, and the third virtual object.

3. The mobile device of claim 2, wherein the processor is configured to:
   separate, based on a second input, a video frame of the real world scene into a static portion that contains video content that does not move within the real world scene and a dynamic portion that contains video content that does move within the real world scene, wherein the second input indicates a bounding region for the dynamic portion of the video frame.

4. The mobile device of claim 3, wherein the first input indicates:
- the first virtual object is to be statically tied to the real world scene;
- the third virtual object is to be dynamically inserted and move with a movement of the dynamic portion of the real world scene; and
- the 6 DoF poses to insert the first and the third virtual objects into the real world scene.

5. The mobile device of claim 1, wherein the processor is configured to:
- extract a set of two-dimensional (2D) keypoints from a plurality of image frames at different points in time;
- establish a correspondence between the extracted set of 2D keypoints in the plurality of image frames; and
- triangulate corresponding pairs of extracted set of 2D keypoints to determine a location of a three-dimensional (3D) point in 3D space.

6. The mobile device of claim 3, wherein the processor is configured to compute a current 6 DoF static pose for the mobile device based on the static portion as well as a current 6 DoF dynamic pose for the third virtual object in the dynamic portion.

7. The mobile device of claim 6, wherein the processor is configured to:
- project a priori estimates for a current mobile device pose from a previous filtered 6 DoF static pose and a previous filter 6 DoF dynamic poses; and
- compute an improved a posteriori estimate of the current 6 DoF static pose and the current 6 DoF dynamic pose.

8. The mobile device of claim 6, wherein compute the current 6 DoF dynamic pose for the third virtual object in the dynamic portion comprises:
- defining a polyhedron centered at a triangulated dynamic 3D point, wherein the dynamic 3D point being within the dynamic portion of the real world scene;
- computing a convex hull region based on projected 2D points of the vertices of each polyhedron; and
- averaging the convex hull regions together to obtain a dynamic region of the third virtual object in a current video frame.

9. The mobile device of claim 1, wherein the processor is configured to
- determine a correspondence between 3D points in real world video frames acquired by multiple mobile devices; and
- align static 3D points of the multiple mobile devices based upon the determined correspondence, wherein the static 3D points comprise 3D points within a static portion of the real world scene.

10. A method implemented on a mobile device, comprising:
- generating a first augmented reality scene comprising at least a first virtual object positioned at a first location in a real world scene;
- receiving data comprising at least a second virtual object from a second mobile device, the received second virtual object having been inserted into the real world scene of a second augmented reality scene on the second mobile device, wherein the data includes location information indicating a second location of the second virtual object within the real world scene in the second augmented reality scene; and
- rendering a shared augmented reality scene on a display, wherein the shared augmented reality scene comprises both the first virtual object positioned at the first location in the real world scene and the received second virtual object positioned at the second location in the real world scene, wherein at least one of the first virtual object and the second virtual object is a dynamic virtual object that is dynamically inserted in the shared augmented reality scene to enable movement of the dynamic virtual object with real moving objects in the real world scene.

11. The method of claim 10, further comprising receiving input as to 6 degree-of-freedom (DoF) poses to insert the first virtual object and a third virtual object into the real world scene, wherein rendering comprises rendering the real world scene with the first virtual object, the second virtual object, and the third virtual object.

12. The method of claim 11, further comprising separating a video frame of the real world scene into a static portion that contains video content that does not move within the real world scene and a dynamic portion that contains video content that does move within the real world scene.

13. The method of claim 12, wherein the received input indicates that the first virtual object is to be statically inserted into the real world scene, the third virtual object is to be dynamically inserted and move with the dynamic portion of the real world scene, and 6 DoF poses of the first virtual object and third virtual object in the first real world scene.

14. The method of claim 10, further comprising:
- determining a correspondence between static portions in real world video frames acquired by multiple mobile devices; and
- aligning static portions of the multiple mobile devices.

* * * * *